(12) United States Patent
Kim et al.

(10) Patent No.: US 12,540,979 B2
(45) Date of Patent: Feb. 3, 2026

(54) ELECTRONIC DEVICE AND METHOD FOR ESTIMATING BATTERY STATE

(71) Applicant: SAMSUNG ELECTRONICS CO., LTD., Suwon-si (KR)

(72) Inventors: Jinho Kim, Yongin-si (KR); Tae Won Song, Yongin-si (KR); Young Hun Sung, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 449 days.

(21) Appl. No.: 17/826,620

(22) Filed: May 27, 2022

(65) Prior Publication Data
US 2023/0073869 A1 Mar. 9, 2023

(30) Foreign Application Priority Data
Sep. 8, 2021 (KR) .................. 10-2021-0119543

(51) Int. Cl.
*G01R 31/367* (2019.01)
*G01R 31/3842* (2019.01)
(Continued)

(52) U.S. Cl.
CPC ....... *G01R 31/367* (2019.01); *G01R 31/3842* (2019.01); *H01M 10/4285* (2013.01); *H01M 10/486* (2013.01)

(58) Field of Classification Search
CPC .............. G01R 31/367; G01R 31/3842; G01R 31/388; H01M 10/4285; H01M 10/486; Y02E 60/10
See application file for complete search history.

(56) References Cited

U.S. PATENT DOCUMENTS 6,411,911 B1  6/2002  Hirsch et al.
6,789,026 B2  9/2004  Barsoukov et al.
(Continued)

FOREIGN PATENT DOCUMENTS

CN    101088820 A  * 12/2007
EP    3 624 252 A1    3/2020
(Continued)

OTHER PUBLICATIONS

Extended European search report issued on Feb. 7, 2023, in counterpart European Patent Application No. 22186902.7 (58 pages in English).

*Primary Examiner* — Yoshihisa Ishizuka
(74) *Attorney, Agent, or Firm* — Sughrue Mion, PLLC

(57) ABSTRACT

An electronic device for estimating a battery state and an operating method thereof are disclosed. The electronic device including a temperature sensor configured to measure a temperature of the battery, a current sensor configured to measure a current of the battery, a voltage sensor configured to measure a voltage of the battery, and a processor configured to estimate a temperature profile of the battery based on the temperature and the current of the battery and a battery model, determine an overvoltage profile of the battery based on the temperature profile, revise the overvoltage profile based on a current state of charge (SOC) and the voltage of the battery, and estimate an unusable SOC of the battery based on the revised overvoltage profile and an open circuit voltage (OCV) profile of the battery.

22 Claims, 14 Drawing Sheets

(51) Int. Cl.
*H01M 10/42* (2006.01)
*H01M 10/48* (2006.01)

(56) References Cited

U.S. PATENT DOCUMENTS

| | | | |
|---|---|---|---|
| 6,832,171 | B2 | 12/2004 | Barsoukov et al. |
| 6,892,148 | B2 | 5/2005 | Barsoukov et al. |
| 8,198,863 | B1 | 6/2012 | Wortham |
| 8,507,121 | B2 | 8/2013 | Saito et al. |
| 8,754,611 | B2 | 6/2014 | Greening et al. |
| 8,846,233 | B2 | 9/2014 | Lee et al. |
| 9,236,748 | B2 | 1/2016 | Barsoukov et al. |
| 9,660,462 | B2 | 5/2017 | Jeon |
| 9,787,118 | B2 | 10/2017 | Wortham |
| 9,895,991 | B2 | 2/2018 | Kim et al. |
| 9,979,211 | B2 | 5/2018 | Barsukov et al. |
| 10,003,106 | B2 | 6/2018 | Jeon et al. |
| 2011/0234167 | A1* | 9/2011 | Kao .................. G01R 31/3828 320/132 |
| 2013/0158916 | A1* | 6/2013 | Baruzzi .............. G01R 31/3842 702/63 |
| 2015/0028808 | A1* | 1/2015 | Bernardi ............... H02J 7/0048 320/109 |
| 2015/0255482 | A1 | 9/2015 | Takahash et al. |
| 2018/0136283 | A1* | 5/2018 | Song .................. G01R 31/3828 |
| 2018/0143254 | A1* | 5/2018 | Kim ...................... G01R 31/367 |
| 2019/0115769 | A1 | 4/2019 | Chen et al. |
| 2019/0128968 | A1* | 5/2019 | Song .................. G01R 31/388 |

FOREIGN PATENT DOCUMENTS

| | | |
|---|---|---|
| JP | 2020-47587 A | 3/2020 |
| KR | 10-1486470 B1 | 1/2015 |
| KR | 10-1912615 B1 | 10/2018 |
| KR | 10-2040880 B1 | 11/2019 |
| KR | 10-2020-0048648 A | 5/2020 |
| KR | 10-2255914 B1 | 5/2021 |
| KR | 10-2022-0029109 A | 3/2022 |

* cited by examiner

ELECTRONIC DEVICE AND METHOD FOR ESTIMATING BATTERY STATE

CROSS-REFERENCE TO RELATED APPLICATIONS

This application claims the benefit under 35 USC § 119(a) of Korean Patent Application No. 10-2021-0119543, filed on Sep. 8, 2021, in the Korean Intellectual Property Office, the entire disclosure of which is incorporated herein by reference for all purposes.

BACKGROUND

1. Field

The following description relates to an electronic device and method for estimating a battery state.

2. Description of Related Art

For optimal battery management, states of batteries may be estimated using various methods. For example, the states of batteries may be estimated by integrating currents of the batteries or by using a battery model (for example, an electric circuit model or an electrochemical model).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an electronic device including a temperature sensor configured to measure a temperature of the battery, a current sensor configured to measure a current of the battery, a voltage sensor configured to measure a voltage of the battery, and a processor configured to estimate a temperature profile of the battery based on the temperature and the current of the battery and a battery model, determine an overvoltage profile of the battery based on the temperature profile, revise the overvoltage profile based on a current state of charge (SOC) and the voltage of the battery, and estimate an unusable SOC of the battery based on the revised overvoltage profile and an open circuit voltage (OCV) profile of the battery.

The processor may be configured to determine the overvoltage profile by moving the temperature profile for a starting point of the overvoltage profile to have a predetermined value.

The processor may be configured to correct the overvoltage profile based on a current overvoltage obtained by subtracting the voltage of the battery from an OCV corresponding to the current SOC of the battery.

The processor may be configured to correct the overvoltage profile by scaling the overvoltage profile that is determined to have the current overvoltage in the current SOC.

The processor may be configured to estimate a voltage profile by subtracting the revised overvoltage profile from the OCV profile, and to estimate the unusable SOC corresponding to an end of discharging voltage (EDV) in the voltage profile.

The battery model may include a simplified model of an electrochemical model stored in a memory of the electronic device, the simplified model being configured to estimate the temperature profile of the battery using the parameters of the electrochemical model, or a model identical to the electrochemical model.

The simplified model may be configured to estimate the temperature profile of the battery based on an ion concentration distribution inside the battery being constant.

The processor may be configured to estimate the unusable SOC of the battery based on any one or any combination of a predetermined period, and in response to a change in at least one of the temperature or the current of the battery.

The processor may be configured to estimate a portion of the temperature profile based on the temperature and the current of the battery and the battery model, estimate a next portion of the temperature profile, in response to estimation for an entire portion of the temperature profile not being completed, and determine the overvoltage profile based on the temperature profile, in response to estimation for the entire portion of the temperature profile being completed.

The unusable SOC may correspond to an SOC, in response to the battery reaching an EDV as the battery is discharged due to a current output from the battery.

The processor may be configured to estimate a relative state of charge (RSOC) of the battery based on the unusable SOC and the current SOC.

The processor may be configured to estimate the current SOC of the battery based on an electrochemical model stored in a memory of the electronic device.

The processor may be configured to determine an available capacity of the battery based on a difference between the unusable SOC and the current SOC, determine remaining usage time by dividing the available capacity by the current of the battery, and determine a remaining mileage of the electronic device by multiplying the remaining usage time by a moving speed of the electronic device.

In another general aspect, there is provided an electronic device including a battery, and a processor configured to estimate a temperature profile of the battery based on a temperature and a current of the battery and a battery model, determine an overvoltage profile of the battery based on the temperature profile, revise the overvoltage profile based on a current state of charge (SOC) and a voltage of the battery, and estimate an unusable SOC of the battery based on the revised overvoltage profile and an open circuit voltage (OCV) profile of the battery.

In another general aspect, there is provided a processor-implemented method of operating an electronic device, the method including estimating a temperature profile of a battery based on a temperature and current of the battery and a battery model corresponding to the battery, determining an overvoltage profile of the battery based on the temperature profile, revising the overvoltage profile based on a current state of charge (SOC) and a voltage of the battery, and estimating an unusable SOC of the battery based on the revised overvoltage profile and an open circuit voltage (OCV) profile of the battery.

The determining of the overvoltage profile may include determining the overvoltage profile by moving the temperature profile for a starting point of the overvoltage profile to have a predetermined value.

The revising of the overvoltage profile may include correcting the overvoltage profile based on a current overvoltage obtained by subtracting the voltage of the battery from an OCV corresponding to the current SOC of the battery.

The estimating of the unusable SOC of the battery may include estimating a voltage profile by subtracting the revised overvoltage profile from the OCV profile, and estimating the unusable SOC corresponding to an end of discharging voltage (EDV) in the voltage profile.

The battery model may include a simplified model of an electrochemical model, the simplified model being configured to estimate the temperature profile of the battery using parameters of the electrochemical model, or a model identical to the Other features and aspects will be apparent from the following detailed description, the drawings, and the claims.

Figure 1:
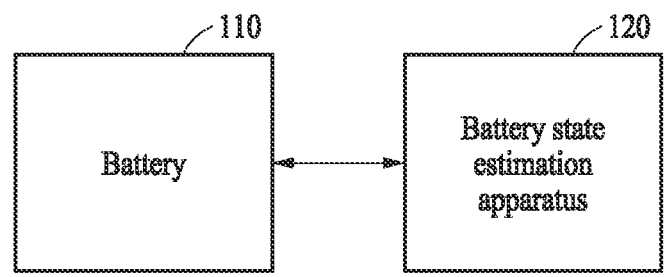
FIGS. 1 to 4 illustrate an example of a battery system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third," A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The use of the term "may" herein with respect to an example or embodiment (e.g., as to what an example or embodiment may include or implement) means that at least one example or embodiment exists where such a feature is included or implemented, while all examples are not limited thereto.

Hereinafter, example embodiments will be described in detail with reference to the accompanying drawings. When describing the example embodiments with reference to the accompanying drawings, like reference numerals refer to like components and a repeated description related thereto will be omitted.

Referring to FIG. 1, a battery system 100 includes a battery 110 and a battery state estimation apparatus 120.

The battery 110 may be one or more of battery cells, battery modules, or battery packs.

The battery state estimation apparatus 120 may measure the battery 110 using one or more sensors. In other words, the battery state estimation apparatus 120 may collect measurement data of the battery 110. For example, the measurement data may include voltage data, current data, and/or temperature data.

The battery state estimation apparatus 120 may estimate state information of the battery 110, based on the measurement data, and may output the result. The state information may include, for example, a state of charge (SOC), a relative state of charge (RSOC), a state of health (SOH), and/or abnormality state information. A battery model used to estimate the state information is an electrochemical thermal (ECT) model, which is described with reference to FIG. 4.

Figure 2:
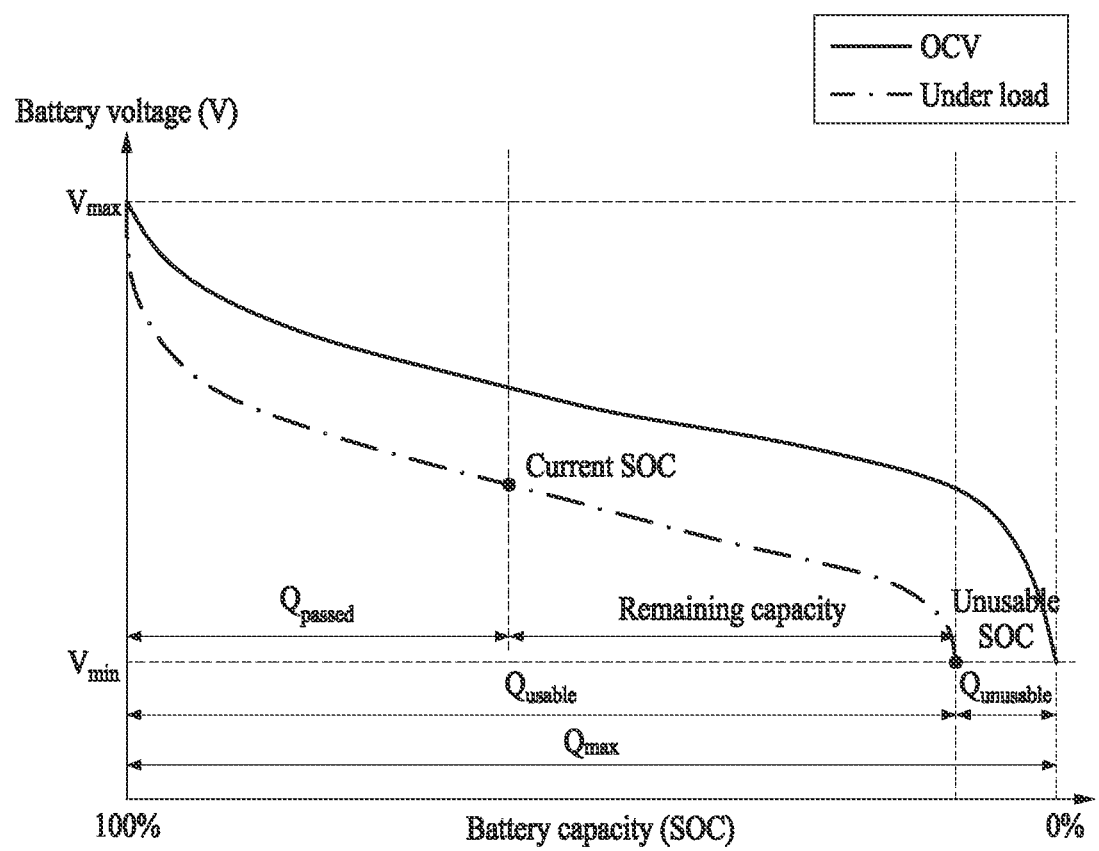

Referring to FIG. 2, an example for describing an SOC and RSOC is illustrated.

The SOC may refer to a currently available capacity out of a total capacity of a battery, which is designed based on an open-circuit voltage (OCV), and may be represented by Equation 1 shown below. The SOC may be determined based on an OCV graph shown in FIG. 2. Referring to FIG. 2, $V_{max}$ may denote a fully charged voltage, which is a voltage when a battery is fully charged, $V_{min}$ may denote an end of discharge voltage (EDV), which is a voltage fully discharged based on an OCV. For example, $V_{min}$ may represent a voltage set by a manufacturer to prevent a battery from no longer being discharged.

$$SOC = \frac{Q_{max} - Q_{passed}}{Q_{max}} \quad \text{[Equation 1]}$$

In Equation 1, $Q_{max}$ may denote a designed capacity, which is a total capacity of a battery designed based on an OCV, and $Q_{passed}$ may denote a currently used battery capacity. Accordingly, '$Q_{max}$-$Q_{passed}$' may represent a currently available capacity based on the OCV. Since the SOC indicates an absolute SOC regardless of a discharge current, the SOC may be referred to as an absolute SOC (ASOC). In addition, the SOC may be referred to as a current SOC since the SOC indicates an SOC of a battery in a current state.

A battery may be discharged by applying a current to a connected load. In actual usage, an RSOC based on an under load voltage may be utilized rather than the SOC based on the OCV. The RSOC may refer to a currently available capacity out of a total available capacity based on a voltage when a current is applied, and may represent a total available capacity from a perspective of a user. The RSOC may be determined by Equation 2 shown below, based on an under load graph of FIG. 2.

$$\begin{aligned}RSOC &= \frac{Q_{usable} - Q_{passed}}{Q_{usable}} \quad \text{[Equation 2]}\\ &= \frac{Q_{max} - Q_{passed} - Q_{unusable}}{Q_{max} - Q_{unusable}}\\ &= \frac{\frac{Q_{max} - Q_{passed}}{Q_{max}} - \frac{Q_{unusable}}{Q_{max}}}{1 - \frac{Q_{unusable}}{Q_{max}}}\\ &= \frac{SOC - SOC_{unusable}}{1 - SOC_{unusable}}\end{aligned}$$

In Equation 2, $Q_{usable}$ may denote a full charge capacity (FCC), which is a total available capacity based on a voltage when a current is applied as the load is connected to a battery. $Q_{usable}$ may be determined by '$Q_{max}$-$Q_{unusable}$'. $Q_{unusable}$ May Represent an Unusable capacity that further discharge is limited as a battery, which is connected to the load, reaches an EDV. $Q_{unusable}$ may vary depending on a current intensity, temperature, and/or an aged state of the battery.

For example, in case a current is output from the battery as the load is connected to the battery, an output voltage of the battery may be lower than the OCV. Thus, the under load graph of FIG. 2 may have a lower value than the OCV graph. In other words, as a current output from the battery increases, a gap between the under load graph and the OCV graph may increase. As the current output from the battery increases, $Q_{unusable}$ may increase.

Accurate prediction of $Q_{usable}$ and $Q_{passed}$ is needed to accurately predict an RSOC of the battery. However, as described above, accurate prediction may be difficult since $Q_{usable}$ is determined based on $Q_{unusable}$, which may vary based on a current intensity and temperature, and thus, the RSOC may be determined by an equation using an SOC, not Q, as Equation 2. The RSOC may be determined based on an SOC and $SOC_{unusable}$. In this case, the SOC may denote a current SOC determined by Equation 1, and the unusable SOC ($SOC_{unusable}$) may denote an SOC when a battery reaches an EDV as the battery is discharged due to current application. The unusable SOC may represent an SOC in the EDV and may vary depending on a current intensity, temperature, and/or an aged state of the battery. The unusable SOC may be referred to as an $SOC_{EDV}$.

An intensity of an output current of the battery may vary based on an operation type of a device on which a battery is installed. For example, an intensity of an output current may vary based on diverse operation types such as playing a game, playing a video, and playing music on a smartphone, and as an unusable SOC varies, an RSOC based on the unusable SOC may also vary. The available operating time of the device may be shorter when playing a video compared to playing music. The unusable SOC may correspond to predicting a future state from a current state by estimating an SOC when the battery reaches the EDV as the battery is discharged by an intensity of a current that is the same as the intensity of a currently applied current. Hereinafter, an operation of estimating an unusable SOC, furthermore, estimating an RSOC, is described further below.

Figure 3:
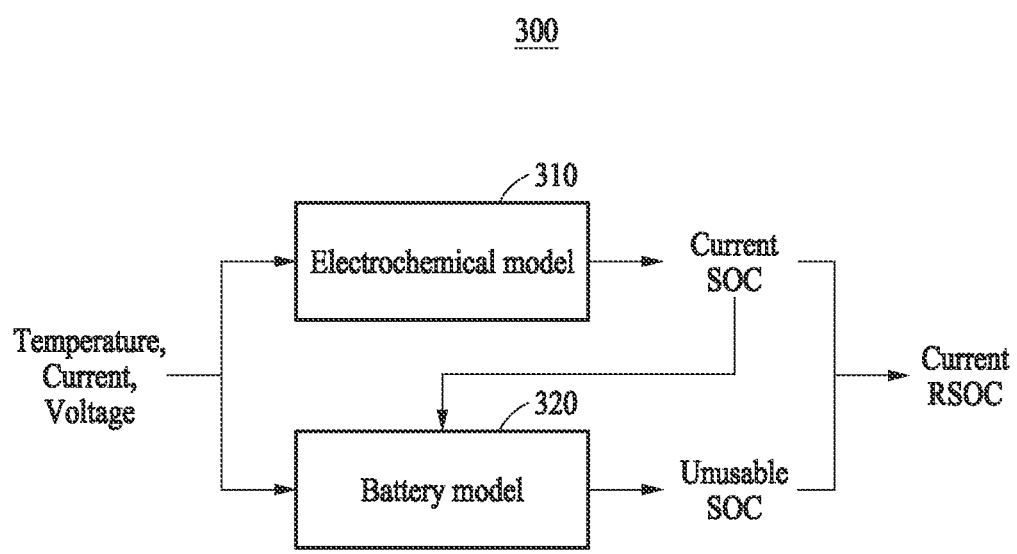

Referring to FIG. 3, an electronic device 300 may estimate a current SOC and an unusable SOC of a battery by using an electrochemical model 310 and a battery model 320.

The electronic device 300 may estimate the current SOC using the electrochemical model 310. For example, the electronic device 300 may determine a variation (for example, ΔSOC) of a battery state using a voltage difference between a measured voltage and an estimated voltage of the battery, may update an internal state (for example, a lithium ion concentration distribution) of the electrochemical model 310 using the variation, and may estimate a current SOC of the battery through the updated electrochemical model 310. The estimated voltage may be a voltage, estimated by the electrochemical model 310, of the battery. An operation of estimating a current SOC based on the electrochemical model 310 is disclosed in U.S Patent Application Publication No. 2021/0116510, the entire disclosure of which is incorporated herein in its entirety by reference.

The electronic device 300 may estimate the unused SOC using the battery model 320. For example, the battery model 320 may be a simplified model of the electrochemical model 310 and may be a lumped model based on an assumption that an ion concentration distribution inside the battery is constant. The lumped model may estimate a temperature profile of the battery using parameters of the electrochemical model 310. The electronic device 300 may effectively reduce an operation amount by estimating the temperature profile using the lumped model obtained by simplifying the electrochemical model 310. In another example, the battery model 320 may be identical to the electrochemical model 310. The electronic device 300 may estimate a temperature profile of a battery, which will be described through the electrochemical model 310 below. Since the electrochemical model 310 may be a model that is not based on the assumption that an ion concentration distribution inside the battery is constant, a large amount of computations for estimating the temperature profile of the battery may be required. However, the accuracy of temperature profile estimation may be high. However, an example of the battery model 320 is not limited thereto, and various battery models may be applied without limitation.

The electronic device 300 may convert the temperature profile into an overvoltage profile, may correct or revise the converted overvoltage profile by a voltage and a current SOC of the battery, and may determine an unusable SOC by determining a voltage profile based on the revised overvoltage profile.

In case a current is applied to the battery, a battery temperature may increase due to various resistance factors, and the temperature profile may represent the battery temperature from a beginning to an end of discharge. In addition, a battery voltage may decrease due to various resistance factors in the battery as a current is applied to the battery. A difference between an OCV and a measured voltage may be referred to as an overvoltage, and an overvoltage profile may represent an overvoltage of the battery that varies while the battery is discharged. A voltage profile may represent a voltage that varies while the battery is discharged, and for example, may represent a variation of voltage with time from the beginning to the end of discharge.

The electronic device 300 may effectively reduce a computational cost by estimating a temperature rather than directly estimating a voltage that requires a large amount of computations by using a similarity in a patterns between the temperature profile and the overvoltage profile. A temperature pattern and an overvoltage pattern may be similar to each other because as a current is applied to the battery, a battery temperature may increase and an overvoltage may occur due to various resistance factors. In addition, the similarity between the temperature pattern and the overvoltage pattern may be described because the temperature and overvoltage may be affected by an OCV feature related to a rate of change in open circuit potential (OCP) according to the temperature, a feature related to an electrode reaction and solid electrolyte interphase (SEI), and a feature related to an electrolyte.

Even if an error occurs in a measured temperature of the battery, the electronic device 300 may robustly estimate an unusable SOC with high accuracy in a low temperature area by correction using a feedback method based on a current state such as a measured voltage or a current SOC of the battery. In addition, the electronic device 300 may effectively reduce a computational cost by obtaining the unusable SOC by estimating the temperature profile that requires a relatively low computational cost, rather than obtaining the unusable SOC by directly estimating the voltage profile that requires a considerable computational cost.

An operation of determining the unusable SOC is further described with reference to FIGS. 5 to 9.

Figure 4:
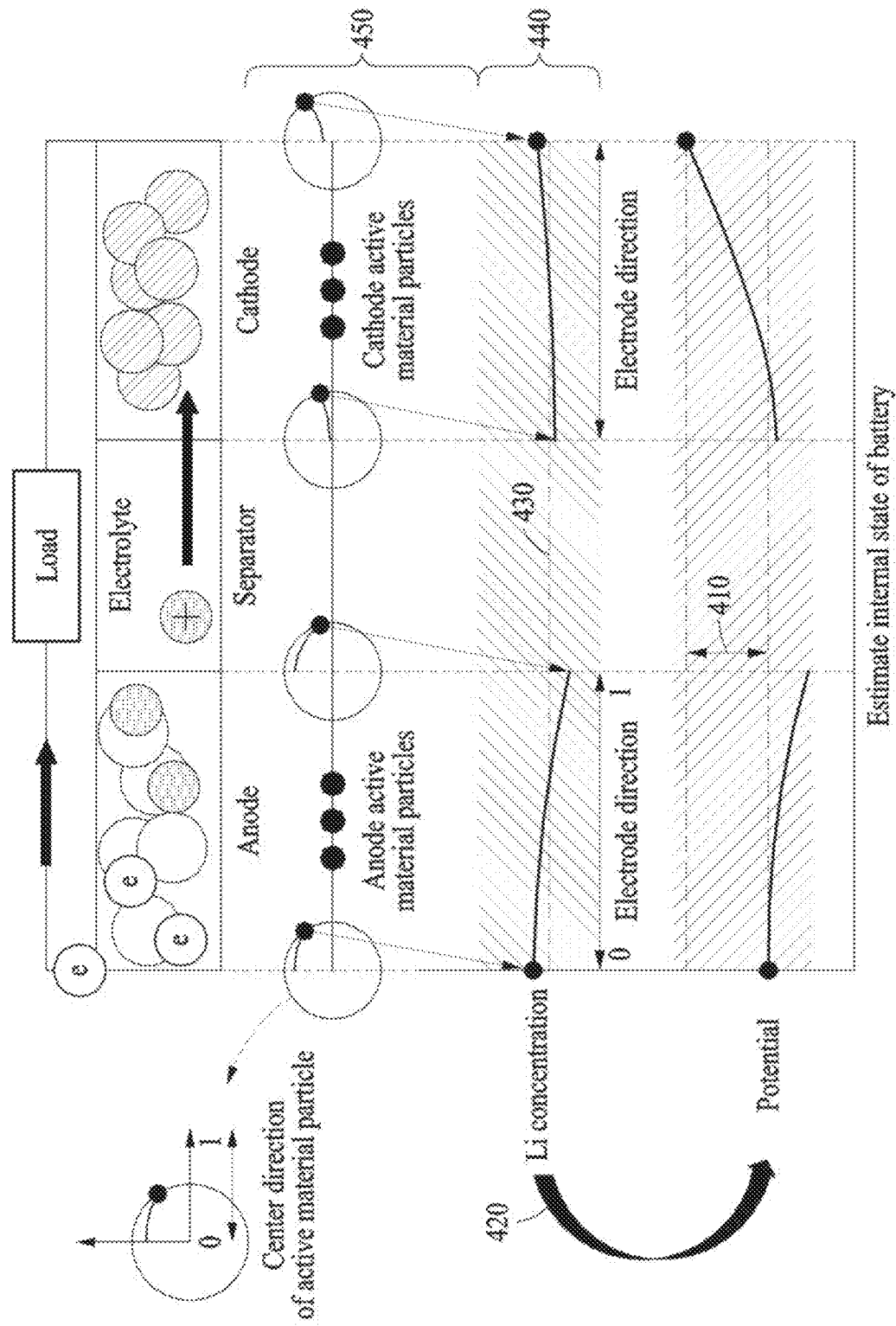

Referring to FIG. 4, an electrochemical model may estimate a residual capacity of a battery by modeling internal physical phenomena of the battery, such as an ion concentration, a potential, and the like. In other words, the electrochemical model may be represented by a physical conservation equation associated with an electrochemical reaction occurring on an electrode/electrolyte interface, an electrode/electrolyte concentration, and the conservation of electrical charges. For this, various model parameters such as a shape (for example, thickness, radius, etc.), an OCP, and a physical property value (for example, electrical conductance, ionic conductance, diffusion coefficient, etc.) are used.

In the electrochemical model, various state variables, such as a concentration and a potential, may be coupled to one another. An estimated voltage 410 estimated by the electrochemical model may be a potential difference between both ends, which are a cathode and an anode. As indicated by arrow 420, potential information of each of the cathode and the anode may be affected by the ion concentration distribution of each of the cathode and the anode. An SOC 430 estimated by the electrochemical model is an average ion concentration of the cathode and the anode.

Here, the ion concentration distribution may be an ion concentration distribution 440 in an electrode or an ion concentration distribution 450 in an active material particle present at a position in the electrode. The ion concentration distribution 440 in the electrode may be a surface ion concentration distribution or an average ion concentration distribution of an active material particle positioned in an electrode direction, and the electrode direction may be a direction connecting one end of the electrode (for example, a boundary adjacent to a collector) and the other end of the electrode (for example, a boundary adjacent to a separator). In addition, the ion concentration distribution 450 in the active material particle may be an ion concentration distribution within the active material particle according to a center direction of the active material particle, and the center direction of the active material particle may be a direction connecting the center of the active material particle to the surface of the active material particle.

To reduce the voltage difference between the measured voltage and the estimated voltage of the battery, the ion concentration distribution of each of the cathode and the anode may be shifted while maintaining the physical conservation associated with concentration, the potential information of each of the cathode and the anode may be derived based on the shifted concentration distribution, and the voltage may be calculated based on the derived potential information of each of the cathode and the anode. The current SOC of the battery may be finally determined by deriving an internal state movement amount that makes the voltage difference be "0".

FIGS. 5 to 9 illustrate an example of an operation of estimating an SOC unusable.

Figure 5:
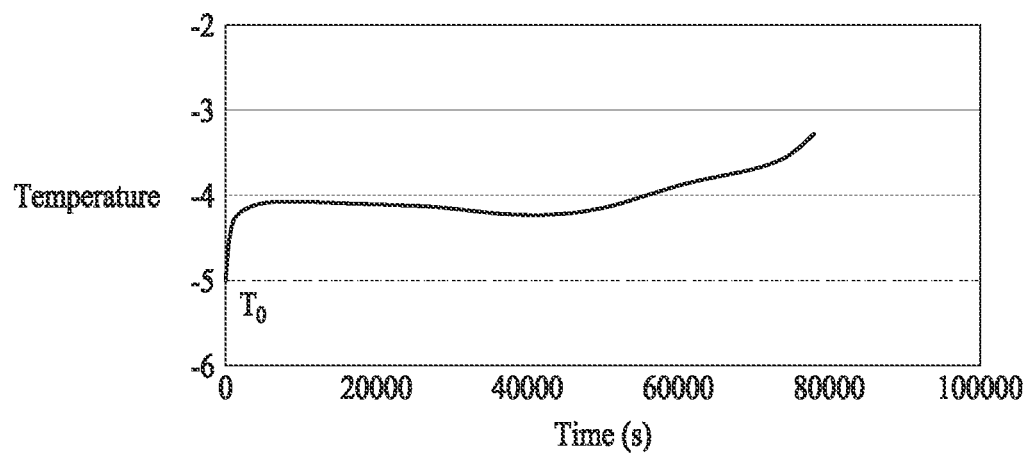
FIGS. 5 to 9 illustrate an example of an operation of estimating a state of charge (SOC) unusable.

Referring to FIG. 5, an electronic device may estimate a temperature profile through a battery model. The electronic device may perform a discharge temperature simulation with respect to a temperature and current of a battery corresponding to a present input condition based on the battery model. For example, an input of current to the battery model may be a moving average, an arithmetic mean, and a weighted average of currents of the battery during a time period or a current that is currently applied. A temperature input to the battery model may be a measured temperature, for example, a measured temperature $T_0$ at the beginning of discharge. The discharge temperature simulation may be performed based on Equations 3 and 4 shown below.

$$T_n = T_{n-1} + \frac{dT}{dt} * dt \qquad \text{[Equation 3]}$$

$$\frac{dT}{dt} = Q_{gen} - h_c * (T_{n-1} - T_\infty)/mc_{p_{cell}}$$

In Equation 3, $T_n$ may denote an estimated temperature in a current time step, $T_{n-1}$ may denote an estimated temperature in a previous time step, $$\frac{dT}{dt}$$

may denote a rate of change in temperature with time, and dt may represent a time interval during calculation. In addition, $Q_{gen}$ may represent a heat generation rate, $h_c$ may represent a convective heat transfer coefficient, and T∞ may represent a measured temperature of a battery surface, "m"" may represent a mass of a cell, and $C_{p_{cell}}$ may represent a specific heat capacity of a cell.

$$Q_{gen} = Q_{reversible} + Q_{irreversible} + Q_{ohmic} =$$

$$I \times T \times \left( \frac{1}{Vol_n} \times \frac{dU}{dT_n} - \frac{1}{Vol_p} \times \frac{dU}{dT_p} \right) +$$

$$I \times \begin{bmatrix} \frac{1}{Vol_p} \times \left\{ \frac{2RT}{F} \left( \sinh^{-1}\left(\frac{j_p}{2j_{o,p}}\right) \right) + R_{f,p} \times F \times j_p \right\} + \\ \frac{1}{Vol_n} \times \left\{ \frac{2RT}{F} \left( \sinh^{-1}\left(\frac{j_n}{2j_{o,n}}\right) \right) + R_{f,n} \times F \times j_n \right\} \end{bmatrix} +$$

$$I^2 \times \left\{ \left( \frac{1}{3 \times K_p} + \frac{1}{3 \times K_n} \right) + \alpha \right\}$$

[Equation 4]

In Equation 4, $Q_{reversible}$ may represent a reversible heat generation rate, $Q_{irreversible}$ may represent an irreversible heat generation rate, and $Q_{ohmic}$ may represent an ohmic heat generation rate. I may denote a current, T may denote a temperature, $Vol_n$ may denote a volume of an anode part, $Vol_p$ may denote a volume of a cathode part, $$\frac{dU}{dT_n}$$

may denote an entropic heat coefficient of an anode, and $$\frac{dU}{dT_p}$$

may denote an entropic heat coefficient of a cathode. R may represent a gas constant, F may represent the Faraday constant, $j_p$ may represent a local current density of a cathode, $j_{o,p}$ may represent an exchange current density of a cathode, $j_n$ may represent a local current density of an anode, and $j_{o,n}$ may represent an exchange current density of an anode. $R_{f,p}$ may represent a film resistance of a cathode, $R_{f,n}$ may represent a film resistance of an anode, $K_p$ may represent an effective electrolyte conductivity in a cathode part, $K_n$ may represent an effective electrolyte conductivity in an anode part, and α may represent an ohmic heat-related term, which is omittable due to its small size. In Equation 4, $Vol_n$, $Vol_p$, $R_{f,p}$, and $R_{f,n}$ may correspond to parameters of an electrochemical model, and $$\frac{dU}{dT_n}, \frac{dU}{dT_p},$$

$j_p$, $j_{o,p}$, $j_n$, and $j_{o,n}$ may correspond to electrochemical calculation state variables.

The parameters of the electrochemical model 310 shown in FIG. 3 may be applied to the above parameters of Equations 3 and 4. In other words, the electronic device may perform a discharge temperature simulation by applying the parameters of the electrochemical model to the battery model.

The electronic device may perform the discharge temperature simulation from beginning to end of discharge of the battery, and an initial temperature $T_0$, which is a battery temperature at a starting point of discharge, of the battery may be measured by a temperature sensor. An example of a temperature profile estimated by the electronic device may be identical to the graph shown in FIG. 5.

Figure 6:
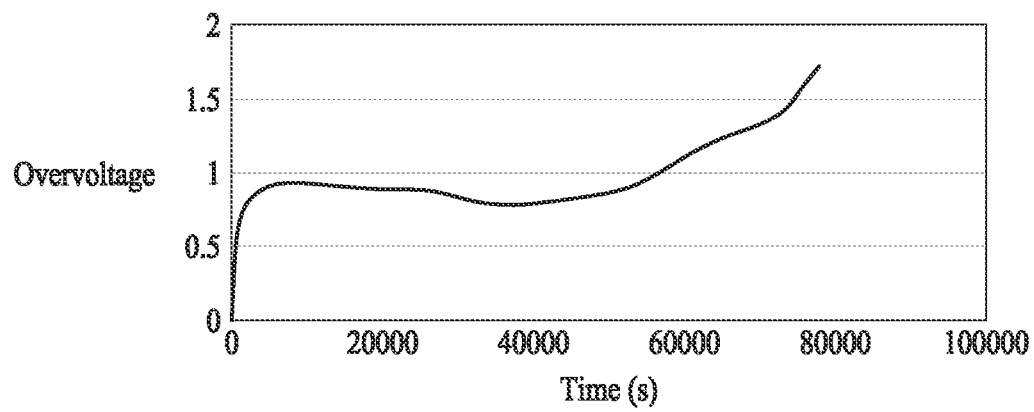

Referring to FIG. 6, the electronic device may determine an overvoltage profile of a battery based on a temperature profile. For example, the electronic device may determine an overvoltage profile by moving a temperature profile such that a starting point of the overvoltage profile may have a predetermined value (for example, "0"). At the starting point of discharge, an overvoltage may be "0" since a battery voltage is equal to an OCV. Thus, the overvoltage profile may be determined by moving the temperature profile in parallel to cause the starting point of the temperature profile to be "0" using a similarity in patterns between the temperature profile and the overvoltage profile as described above since the starting point of the overvoltage profile is "0". An operation of determining an overvoltage profile from a temperature profile may be performed as Equation 5 shown below.

$$\eta_n = T_n - T_0$$ [Equation 5]

In Equation 5, $T_n$ may represent a temperature profile showing a change in temperature with time, $T_0$ may represent an initial value of the temperature profile, and $\eta_n$ may represent an overvoltage profile showing a change in overvoltage with time.

Figure 7:
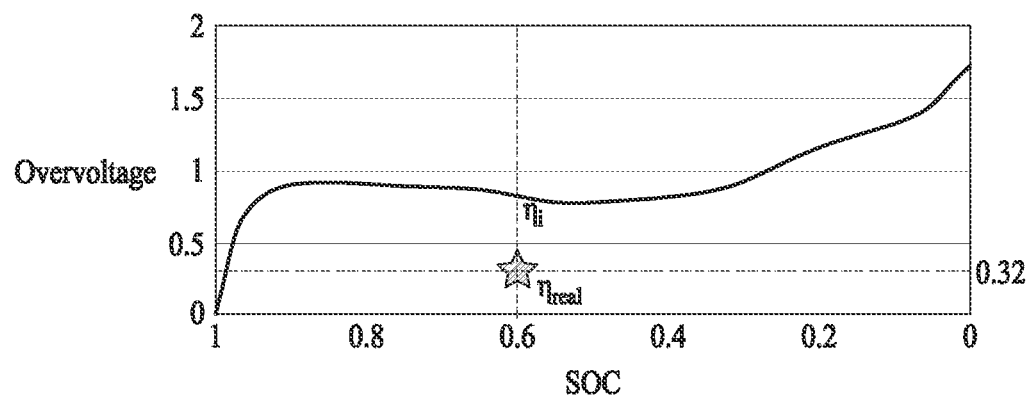

Referring to FIG. 7, the electronic device may convert a time axis of the overvoltage profile into an SOC axis, and may use a battery voltage and a current SOC for correcting or revising the overvoltage profile. The electronic device may calculate a current overvoltage $\eta_{real}$ by subtracting a battery voltage from an OCV corresponding to a current SOC of the battery. For example, the current SOC may be estimated by the electrochemical model 310 of FIG. 3, and the battery voltage may be measured by a voltage sensor. The OCV may be derived from a value corresponding to the current SOC in a preset OCV profile. The overvoltage profile may be corrected to remove a difference between a current overvoltage $\eta_{real}$ and an overvoltage $\eta_i$, which corresponds to the current SOC, in the overvoltage profile determined in FIG. 6. The process is further described with reference to FIG. 8.

Figure 8:
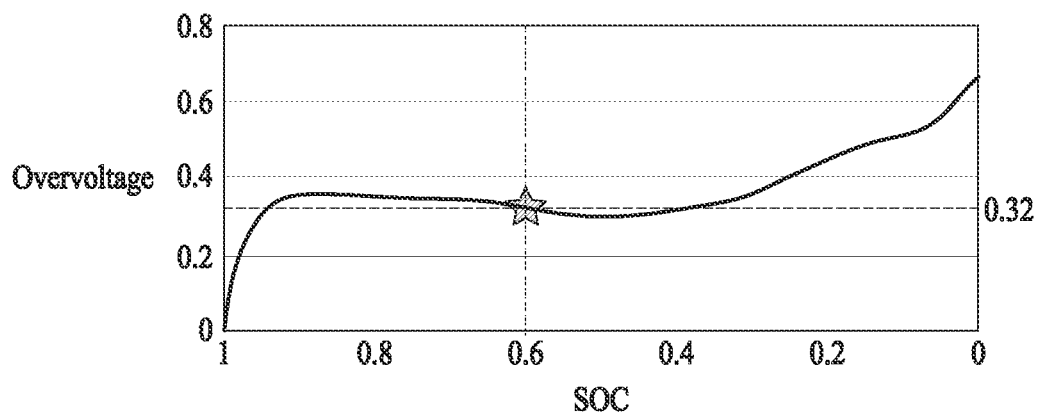

Referring to FIG. 8, an electronic device may correct or revise an overvoltage profile based on a current SOC and a current of a battery. As described above, the electronic device may calculate a current overvoltage $\eta_{real}$ based on a current SOC and a measured voltage, and may perform correction using the current SOC $\eta_{real}$ as Equation 6 shown below.

$$\eta_n^* = \eta_n \times \frac{\eta_{real}}{\eta_i}$$ [Equation 6]

In Equation 6, $\eta_n^*$ may represent a corrected overvoltage profile. By correcting the overvoltage profile based on a current SOC and a measured voltage, the accuracy in estimating an unusable SOC may be effectively enhanced by reflecting a current state of a battery using a feedback method.

Figure 9:
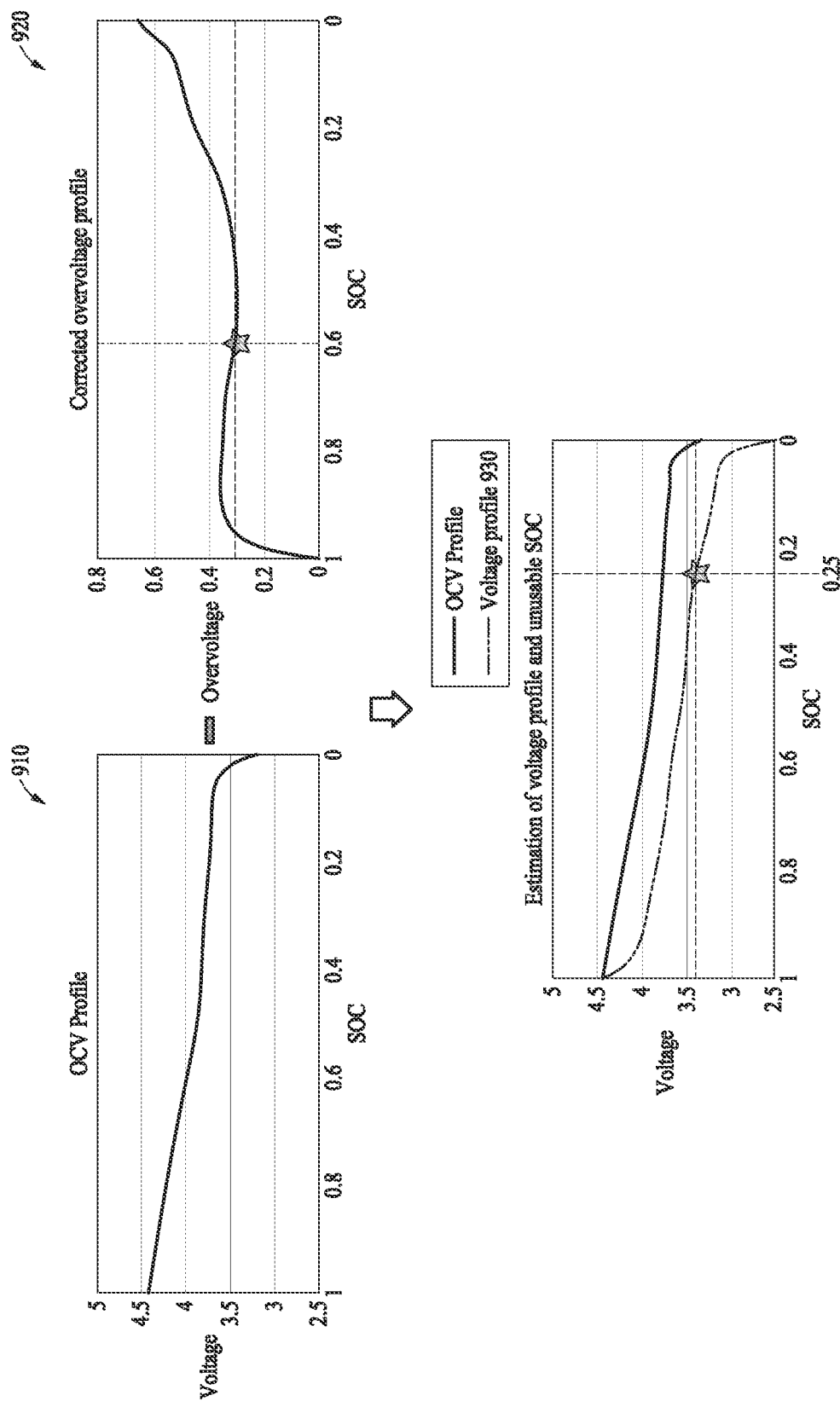

Referring to FIG. 9, an electronic device may estimate an unusable SOC of a battery based on an OCV profile 910 and a corrected overvoltage profile 920. The OCV profile 910 may refer to parameters of an electrochemical model indicating a change in the OCV by an SOC, and may be determined based on a battery specification. The corrected overvoltage profile 920 may show a change in overvoltage with time in a state in which a present condition (for example, a temperature, a current, and the like) of the battery is reflected.

The electronic device may estimate a voltage profile 930 by subtracting the corrected overvoltage profile 920 from the OCV profile 910, which may be expressed by Equation 7 shown below.

$$V_n = OCV_n - \eta_n^* \qquad \text{[Equation 7]}$$

In Equation 7, $V_n$ may denote the voltage profile 930, $OCV_n$ may denote the OCV profile 910, and $\eta_n^*$ may represent a corrected overvoltage profile.

The electronic device may estimate an unusable SOC (for example, 0.25) corresponding to an EDV (for example, 3.4 V) in the voltage profile 930. Furthermore, the electronic device may estimate an RSOC of battery by applying the estimated unusable SOC and the current SOC to Equation 2.

By reflecting a measured voltage and a current SOC, which are current state information of a battery in estimating an unusable SOC, the accuracy in estimating the unusable SOC and RSOC may be enhanced, and may be robust against a measurement error of a temperature sensor. In addition, a feature of a temperature profile may be shown in an RSOC profile, which is determined based on the estimated unusable SOC, by estimating the unusable SOC based on the temperature profile.

Figure 10:
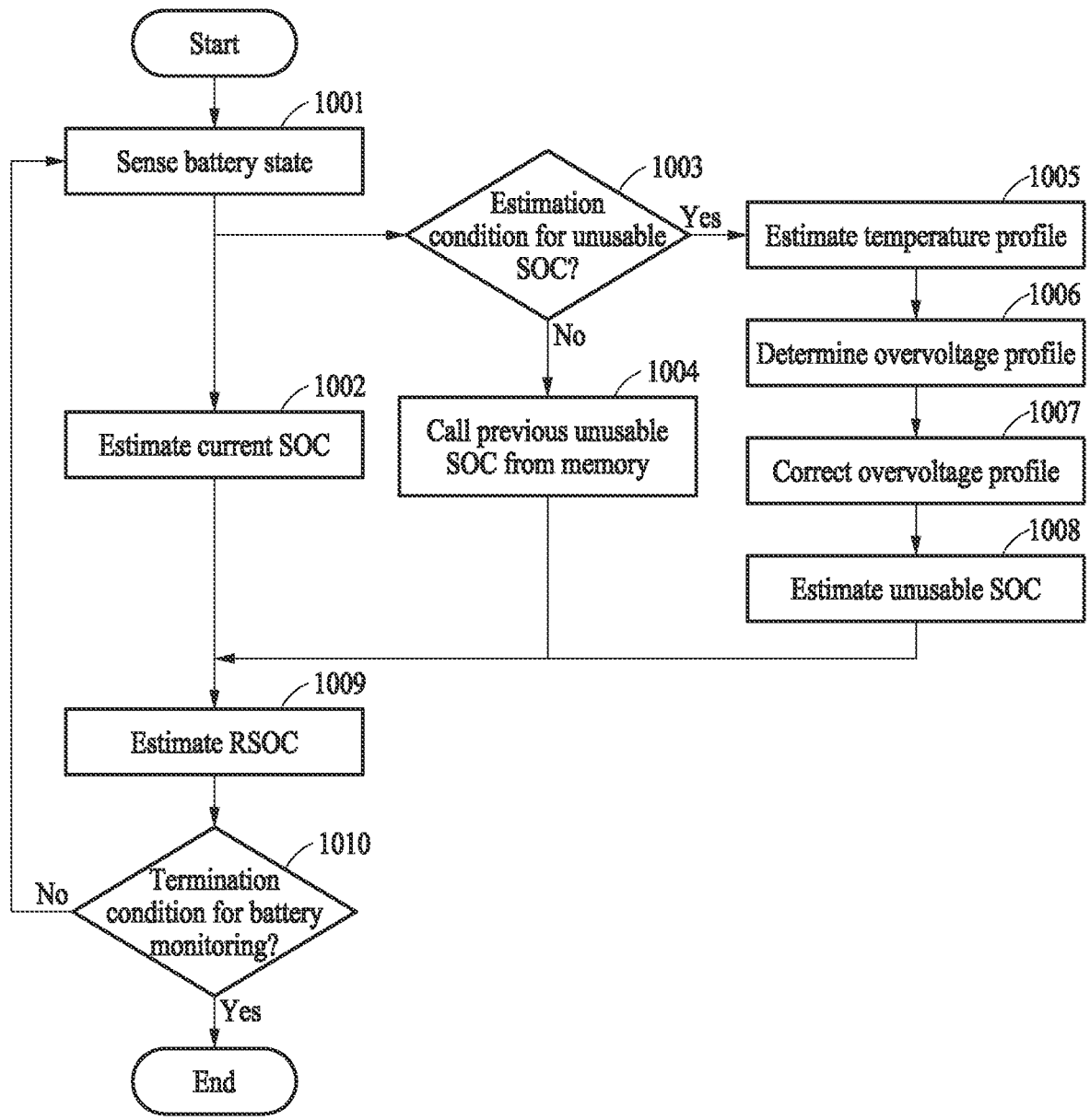
FIGS. 10 and 11 illustrate an example of estimating a relative state of charge (RSOC).
Figure 11:
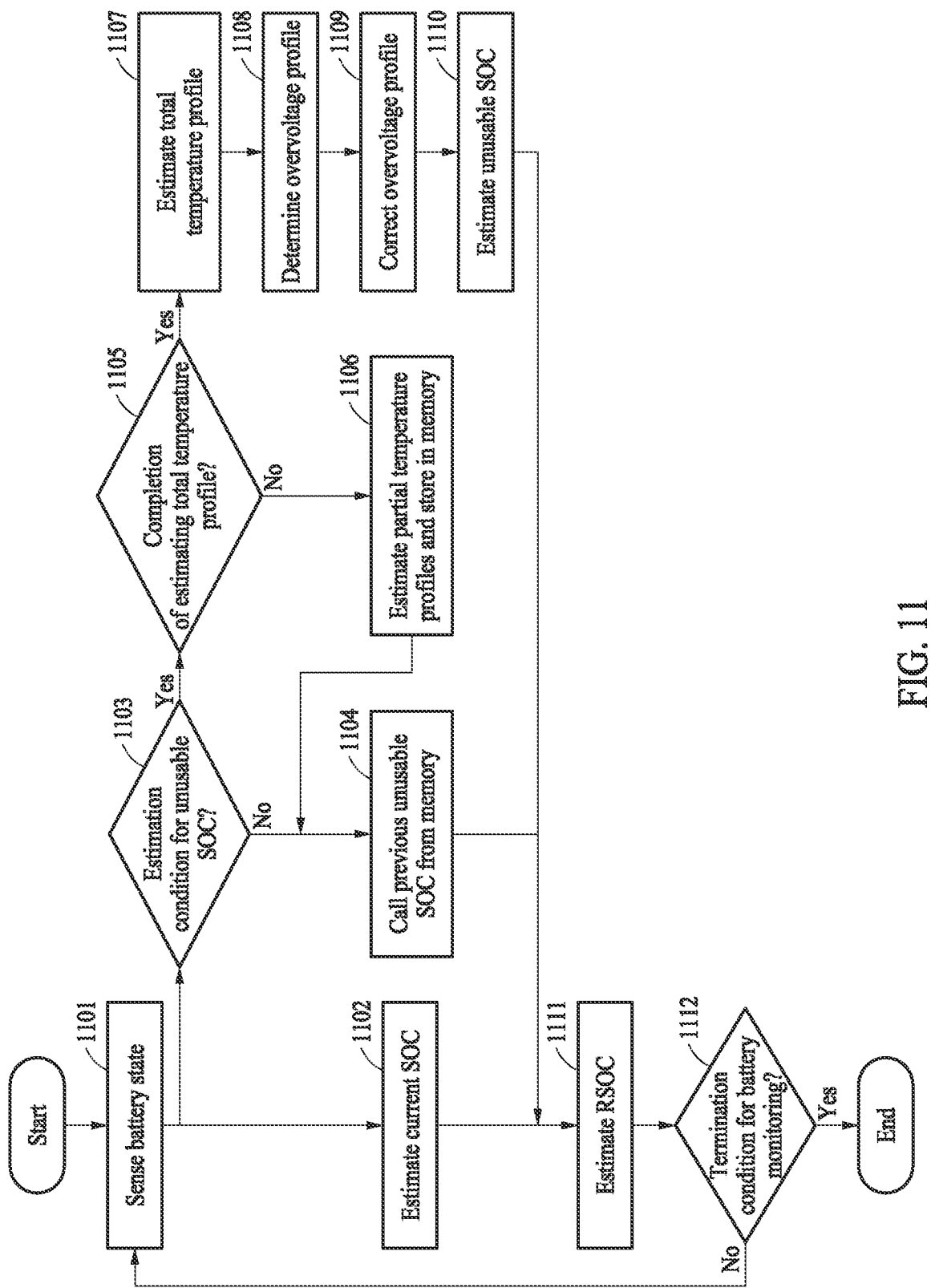

FIGS. 10 and 11 illustrate an example of estimating an RSOC.

Referring to FIG. 10, an example of estimating an unusable SOC and an RSOC based on the unusable SOC and a current SOC by an electronic device is illustrated. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions. In an example, operations 1001 to 1010 may be performed by at least one component (for example, a processor, a sensor, etc.) of the electronic device. In addition to the description of FIG. 10 below, the descriptions of FIGS. 1-9 are also applicable to FIG. 10, and are incorporated herein by reference. Thus, the above description may not be repeated here.

In operation 1001, the electronic device may sense a battery state. For example, the battery state may include a temperature, a current, and a voltage of the battery. The electronic device may store, in a memory, the battery state obtained by sensing.

In operation 1002, the electronic device may estimate a current SOC of the battery by an electrochemical model based on the battery state.

In operation 1003, the electronic device may determine whether an estimation condition for an unusable SOC is reached. For example, the estimation condition for the unusable SOC may include whether at least one of a predetermined period and/or a temperature and current of the battery changes. For example, the electronic device may determine that the estimation condition for the unusable SOC has been reached in every predetermined period (for example, 10 seconds). In addition, the electronic device may determine that the estimation condition for the unusable SOC has been reached whenever at least one of a temperature and a current of the battery changes. In case the temperature and current of the battery are both unchanged, the electronic device may determine that the unusable SOC is also unchanged and may not estimate the unusable SOC again.

In response to a determination that the estimation condition for the unusable SOC has not been reached, operation 1004 may be performed. In another example, in response to a determination that the estimation condition for the unusable SOC has been reached, operation 1005 may be performed.

In operation 1004, since the estimation condition for the unusable SOC has not been reached, the electronic device may not estimate the unusable SOC again and may call a previous unusable SOC stored in the memory.

In operation 1005, the electronic device may estimate a temperature profile of the battery based on a temperature and current of the battery and the battery model. For example, the battery model may be a simplified model of the electrochemical model to estimate a temperature profile of a battery using parameters of the electrochemical model, or an identical model to the electrochemical model. The simplified model may estimate the temperature profile of the battery based on an assumption that an ion concentration distribution inside the battery is constant (for example, an average ion concentration).

In operation 1006, the electronic device may determine an overvoltage profile of the battery based on the temperature profile. For example, the electronic device may determine the overvoltage profile by moving the temperature profile such that a starting point of the overvoltage profile may have a predetermined value.

In operation 1007, the electronic device may correct or revise the determined overvoltage profile based on a current SOC and a voltage of the battery. For example, the electronic device may correct or revise the determined overvoltage profile based on a current overvoltage obtained by subtracting a voltage of the battery from an OCV corresponding to the current SOC. The electronic device may correct or revise the determined overvoltage profile by scaling the determined overvoltage profile, which is determined to have the current overvoltage in the current SOC.

In operation 1008, the unusable SOC of the battery may be estimated based on the corrected overvoltage profile and an OCV profile of the battery. For example, the electronic device may estimate a voltage profile by subtracting the corrected overvoltage profile from the OCV profile, and may estimate the unusable SOC corresponding to an EDV in the voltage profile.

In operation 1009, the electronic device may estimate an RSOC based on the current SOC and the unusable SOC. In an example, Equation 2 may be utilized to estimate the RSOC.

In operation 1010, the electronic device may determine whether a termination condition for monitoring the battery is reached. For example, when a predetermined monitoring period has not lapsed, the electronic device may determine that the termination condition for monitoring has not been reached, and may perform operations 1001 to 1009 for the next period. In another example, when the predetermined monitoring period has elapsed, an operation of the electronic device may be terminated.

Referring to FIG. 11, illustrates an example of estimating an unusable SOC and estimating an RSOC based on the unusable SOC and a current SOC. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer, such as a processor, that perform the specified functions, or combinations of special purpose hardware and computer instructions. In an example, operations 1101 to 1112 may be performed by at least one component (for example, a processor, a sensor, etc.) of the electronic device. In addition to the description of FIG. 11 below, the descriptions of FIGS. 1-10 are also applicable to FIG. 11, and are incorporated herein by reference. Thus, the above description may not be repeated here.

An operation of estimating a temperature profile for estimating an unusable SOC may involve significant computational cost. Considering the limited resources of the electronic device it may be difficult to efficiently calculate a change in temperature from beginning to end of discharge of a battery. The computational cost may be shared by segmenting a total estimation section into N subsections and then calculating a change in temperature for only one subsection at a time rather than performing an operation of estimating the temperature profile at once, which requires a significant computational cost. Through this process, an unusable SOC may be accurately estimated with a low computational load. Operations 1105 to 1107 may be added to the operations described in FIG. 10 to share the computational cost.

In operation 1105, the electronic device may determine whether estimating a total temperature profile is completed. For example, the electronic device may determine whether estimating temperature profiles for N subsections is completed. When estimation of the total temperature profile has not been completed, operation 1106 may be performed. In an example, when estimation of the total temperature profile has been completed, operation 1107 may be performed.

In operation 1106, the electronic device may perform partial temperature profile estimation for one of remaining subsections that have not yet been estimated. Since a total temperature profile has not been estimated, a previous unusable SOC stored in the memory may be called by operation 1104.

In operation 1107, the electronic device may estimate the total temperature profile using partial temperature profiles estimated for N subsections. For example, by concatenating the partial temperature profiles for N subsections, the electronic device may determine the total temperature profile.

The description provided with reference to FIG. 10 may be applicable to the description of operations 1101 to 1104 and 1108 to 1112, and thus, and are incorporated herein by reference. Thus, the above description may not be repeated here for brevity.

Figure 12:
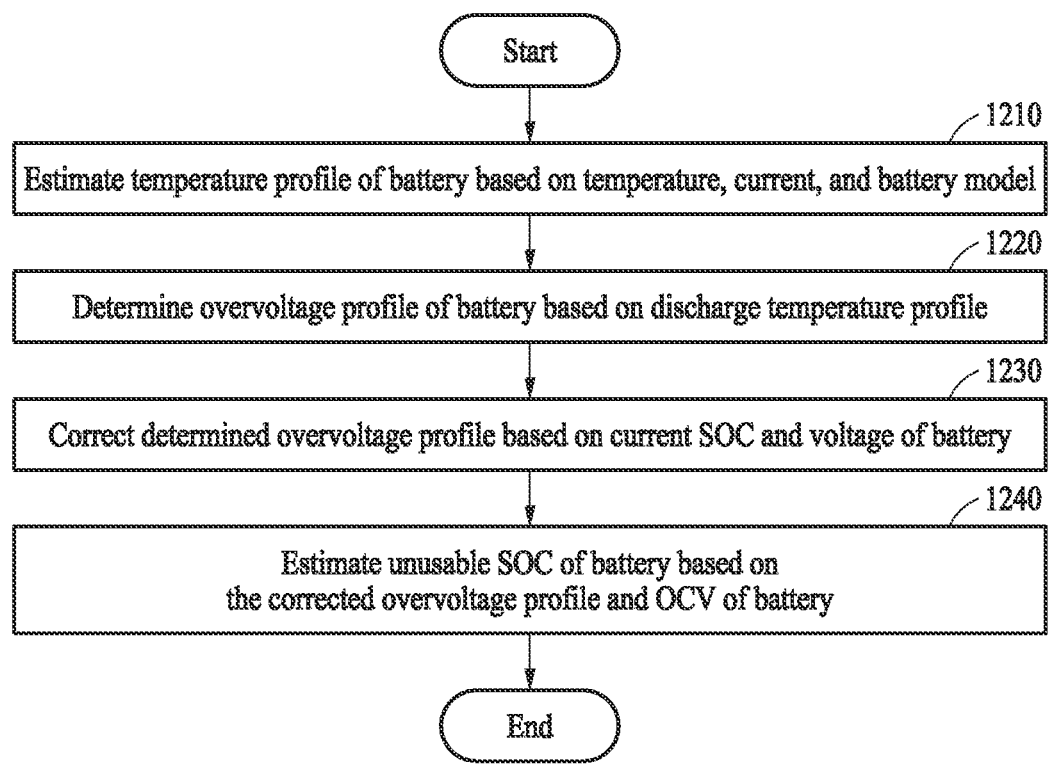
FIG. 12 illustrates an example of an operating method of an electronic device.

FIG. 12 illustrates an example of an operating method of an electronic device. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer, such as a processor, that perform the specified functions, or combinations of special purpose hardware and computer instructions. In addition to the description of FIG. 12 below, the descriptions of FIGS. 1-11 are also applicable to FIG. 12, and are incorporated herein by reference. Thus, the above description may not be repeated here.

In operation 1210, the electronic device may estimate a temperature profile of a battery based on a temperature and a current of the battery and a battery model corresponding to the battery. The battery model may be a simplified model of the electrochemical model, to estimate a temperature profile of a battery using parameters of the electrochemical model, or an identical model to the electrochemical model. In addition, the simplified model may estimate the temperature profile of the battery based on an assumption that an ion concentration distribution inside the battery is constant.

In operation 1220, the electronic device may determine an overvoltage profile of the battery based on a temperature profile. In an example, the electronic device may determine the overvoltage profile by moving the temperature profile such that a starting point of the overvoltage profile may have a predetermined value.

In operation 1230, the electronic device may correct the determined overvoltage profile based on a current SOC and a voltage of the battery. The electronic device may correct the determined overvoltage profile based on a current overvoltage obtained by subtracting a voltage of the battery from an OCV corresponding to the current SOC of the battery. The electronic device may correct the determined overvoltage profile by scaling the determined overvoltage profile, which is determined to have the current overvoltage in the current SOC.

In operation 1240, the unusable SOC of the battery may be estimated based on the corrected overvoltage profile and an OCV profile of the battery. The electronic device may estimate a voltage profile by subtracting the corrected overvoltage profile from the OCV profile, and may estimate the unusable SOC corresponding to an EDV in the voltage profile. The unusable SOC may refer to an SOC when the battery has reached an EDV because the battery is discharged due to a current output from the battery.

The electronic device may estimate an RSOC of the battery based on the unusable SOC and the current SOC.

Figure 13:
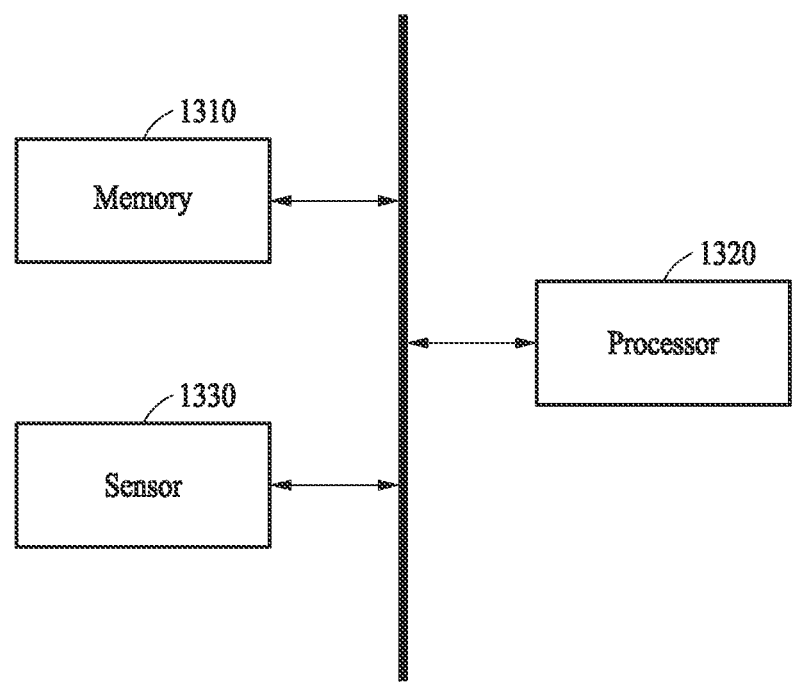
FIG. 13 illustrates an example of an electronic device.

FIG. 13 illustrates an example of an electronic device.

Referring to FIG. 13, an electronic device 1300 may include a memory 1310, a processor 1320, and a sensor 1330. The memory 1310, the processor 1320, and the sensor 1330 may communicate with each other through a bus, peripheral component interconnect express (PCIe), and network on a chip (NoC).

The memory 1310 may store computer-readable instructions. The memory 1310 may store parameters of an electrochemical model corresponding to a battery. In addition, the memory 1310 may store a battery model and the electrochemical model corresponding to the battery. Storing a model may indicate storing relationship information between parameters of the model. The memory 1310 may include any one or any combination of a volatile memory and a non-volatile memory.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 1310 is provided below.

The processor 1320 may perform the operations described above when the instructions stored in the memory 1310 are executed by the processor 1320. The processor 1320 may be a device that executes instructions or programs or that controls the electronic device 1300. The processor 1320 may estimate a discharge temperature profile of a battery based on a temperature and current of the battery and a battery model, may determine an overvoltage profile of the battery based on the discharge temperature profile, may correct the determined overvoltage profile based on a current SOC and voltage of the battery, and may estimate an unusable SOC of the battery based on the corrected overvoltage profile and an OCV profile of the battery.

The processor 1320 may be a data processing device implemented by hardware including a circuit having a physical structure to perform desired operations. For example, the desired operations may include code or instructions included in a program.

The hardware-implemented data processing device may include, for example, a main processor (e.g., a central processing unit (CPU), a field-programmable gate array (FPGA), or an application processor (AP)) or an auxiliary processor (e.g., a GPU, a neural processing unit (NPU), an image signal processor (ISP), a sensor hub processor, or a communication processor (CP)) that is operable independently of, or in conjunction with the main processor. Further details regarding the processor 1320 is provided below.

The sensor 1330 may include any one or any combination of a temperature sensor, a current sensor, and a voltage sensor for measuring a current state of the battery. The data measured by the sensor 1330 may be stored in the memory 1310 and/or transmitted to the processor 1320.

The electronic device 1300 may include a battery management system (BMS) that estimates any one or any combination of a current SOC, an unusable SOC, and an RSOC of a secondary cell battery or a device using a battery, and include, for example, various computing devices such as a mobile phone, a smartphone, a tablet personal computer (PC), a laptop, a PC, or an e-book device, various wearable devices such as a smart watch, smart eyeglasses, a head mounted display (HMD), or smart clothes, various home appliances such as a smart speaker, a smart television (TV), and a smart refrigerator, and other devices such as a smart vehicle, a smart kiosk, an Internet of things (IoT) device, a walking assist device (WAD), a drone, a robot, and the like. In addition, the electronic device 1300 may be implemented in a low-spec device such as a power management integrated circuit (PMIC) by effectively reducing a computational cost by estimating an unusable SOC through estimating a temperature profile based on a lumped model. In addition, the electronic device 1300 may be applied to fast charging by battery state estimation, electrochemical model-based automatic aging update, prediction of an internal short circuit of a battery, fuel gauging of a battery, and the like.

In addition, the electronic device 1300 may process the operations described above.

Figure 14:
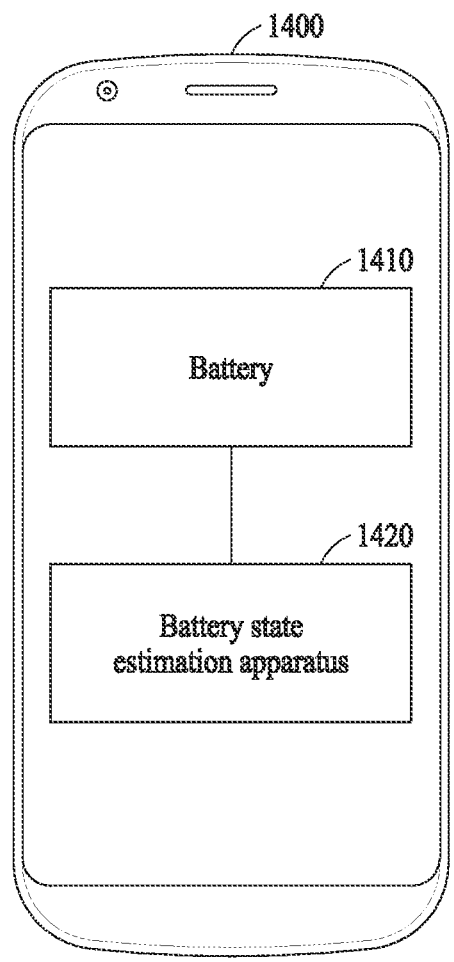
FIG. 14 illustrates an example of a mobile device.

FIG. 14 illustrates an example of a mobile device.

Referring to FIG. 14, a mobile device 1400 may include a battery 1410. The mobile device 1400 may be a device that uses the battery 1410 as a power source. The mobile device 1400 may be a portable terminal, for example, a smartphone. Although FIG. 14 illustrates for ease of description a case in which the mobile device 1400 is a smartphone, various terminals such as a notebook computer, a tablet PC, and a wearable device, such as a smart watch, may be applied thereto without limitation. The battery 1410 includes a BMS and battery cells (or battery modules).

The mobile device 1400 may include a battery state estimation apparatus 1420. The battery state estimation apparatus 1420 may perform an operation of estimating any one or any combination of a current SOC, an unusable SOC, and an RSOC of the battery 1410.

The description provided with reference to FIGS. 1 through 13 may be applicable to the description of FIG. 14, and thus, a detailed description has been omitted.

Figure 15:
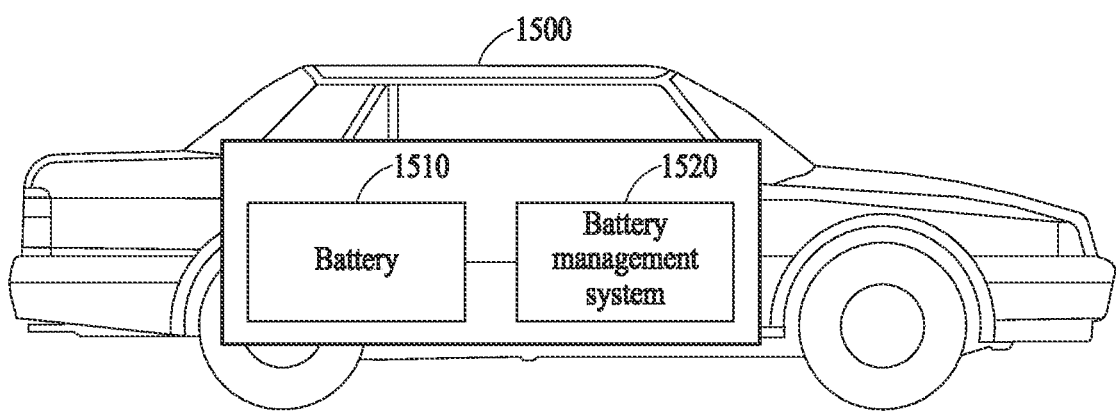
FIGS. 15 and 16 illustrate an example of a vehicle.
Figure 16:
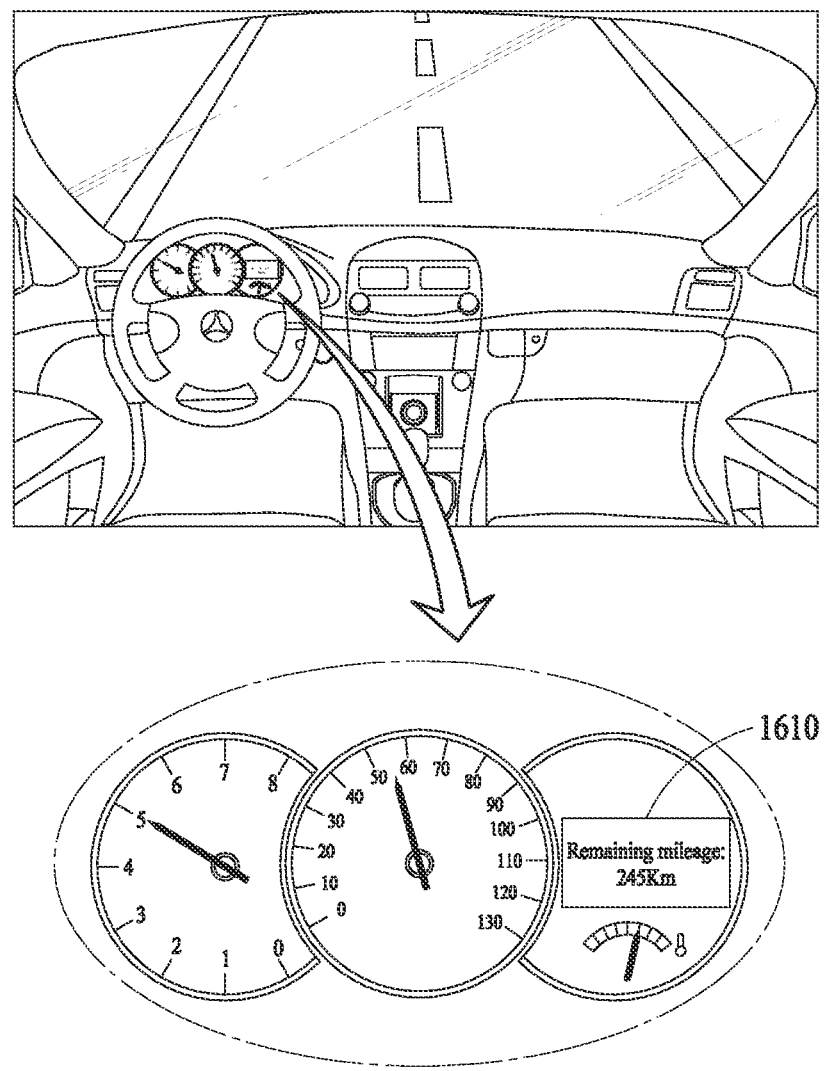

FIGS. 15 and 16 illustrate an example of a vehicle.

Referring to FIG. 15, a vehicle 1500 may include a battery 1510 and a BMS 1520. The vehicle 1500 may use the battery 1510 as a power source. The vehicle 1500 may be, for example, an electric vehicle or a hybrid vehicle.

The battery 1510 may include a plurality of battery modules. A battery module may include a plurality of battery cells.

The BMS 1520 may monitor whether the battery 1510 shows an abnormality and prevent the battery 1510 from being over-charged or over-discharged. Furthermore, the BMS 1520 may perform thermal control for the battery 1510 in case the temperature of the battery 1510 exceeds a first temperature (for example, 40° C.) or is less than a second temperature (for example, −10° C.). In addition, the BMS 1520 may equalize states of charge of battery cells included in the battery 1510 by performing cell balancing.

The BMS 1520 may perform the operation of estimating a battery state as described above. The BMS 1520 may determine a maximum value, a minimum value, or an average value of state information of the battery cells to be the state information of the battery 1510.

The BMS 1520 may transmit the state information of the battery 1510 to an electronic control unit (ECU) or a vehicle control unit (VCU) of the vehicle 1500. The ECU or VCU of the vehicle 1500 may output the state information of the battery 1510 through a display of the vehicle 1500.

In addition, the BMS 1520 may calculate a remaining mileage based on a current SOC and an unusable SOC of the battery. For example, the BMS 1520 may determine a difference between the current SOC and the unusable SOC to be an available SOC. In addition, the BMS 1520 may determine an available battery capacity by multiplying the available SOC by a total battery capacity, and may determine the remaining mileage by dividing the available battery capacity by a present current. In addition, the BMS 1520 may determine the remaining mileage by multiplying a remaining travel time by a current velocity.

As an example of FIG. 16, the ECU or VCU may display the state information of the battery 1510 on an instrument panel 1610 in the vehicle 1500. In another example, the ECU or VCU may display the remaining mileage determined based on the estimated state information on the instrument panel 1610. Although not shown in FIG. 16, the ECU or VCU may display the state information of the battery 1510 and the remaining mileage on a head-up display in the vehicle 1500.

The description provided with reference to FIGS. 1 through 13 may be applicable to the descriptions of FIGS. 15 and 16, and thus detailed descriptions thereof have been omitted for brevity.

The battery system 100, the battery state estimation apparatus 120, battery state estimation apparatus 1420, and other apparatuses, devices, units, modules, and components described herein with respect to FIGS. 1 and 4 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. In an example, the instructions or software includes at least one of an applet, a dynamic link library (DLL), middleware, firmware, a device driver, an application program storing the method of method of operating an electronic device. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An electronic device comprising:
    a temperature sensor configured to measure a temperature of a battery;
    a current sensor configured to measure a current of the battery;
    a voltage sensor configured to measure a voltage of the battery; and
    a processor configured to
    estimate a temperature profile including information of discharge temperatures of the battery based on the measured temperature, the measured current, and a battery model,
    determine an overvoltage profile of the battery based on the temperature profile,
    revise the overvoltage profile based on a current state of charge (SOC) and the voltage of the battery,
    estimate an unusable SOC of the battery based on the revised overvoltage profile and an open circuit voltage (OCV) profile of the battery, and
    control a charging of the battery based on the estimated unusable SOC.

2. The electronic device of claim 1, wherein the processor is further configured to determine the overvoltage profile by moving the temperature profile for a starting point of the overvoltage profile to have a predetermined value.

3. The electronic device of claim 1, wherein the processor is further configured to correct the overvoltage profile based on a current overvoltage obtained by subtracting the measured voltage of the battery from an OCV corresponding to the current SOC of the battery.

4. The electronic device of claim 3, wherein the processor is further configured to correct the overvoltage profile by scaling the overvoltage profile that is determined to have the current overvoltage in the current SOC.

5. The electronic device of claim 1, wherein the processor is further configured to estimate a voltage profile by subtracting the revised overvoltage profile from the OCV profile, and to estimate the unusable SOC corresponding to an end of discharging voltage (EDV) in the voltage profile.

6. The electronic device of claim 1, wherein the battery model comprises an electrochemical model, or a simplified model of the electrochemical model stored in a memory of the electronic device, the simplified model being configured to estimate the temperature profile of the battery using parameters of the electrochemical model.

7. The electronic device of claim 6, wherein the simplified model is configured to estimate the temperature profile of the battery based on an ion concentration distribution inside the battery being constant.

8. The electronic device of claim 1, wherein the processor is further configured to estimate the unusable SOC of the battery based on a predetermined period, and/or in response to a change in at least one of the temperature or the current of the battery.

9. The electronic device of claim 1, wherein the processor is further configured to:
    estimate a portion of the temperature profile based on the measured temperature, the measured current, and the battery model;
    estimate a next portion of the temperature profile, in response to estimation for an entire portion of the temperature profile not being completed; and
    determine the overvoltage profile based on the temperature profile, in response to estimation for the entire portion of the temperature profile being completed.

10. The electronic device of claim 1, wherein the unusable SOC corresponds to an SOC, in response to the battery reaching an EDV as the battery is discharged due to a current output from the battery.

11. The electronic device of claim 1, wherein the processor is further configured to estimate a relative state of charge (RSOC) of the battery based on the unusable SOC and the current SOC.

12. The electronic device of claim 1, wherein the processor is further configured to estimate the current SOC of the battery based on an electrochemical model stored in a memory of the electronic device.

13. The electronic device of claim 1, wherein the processor is further configured to
    determine an available capacity of the battery based on a difference between the unusable SOC and the current SOC,
    determine remaining usage time by dividing the available capacity by the measured current, and
    determine a remaining mileage of the electronic device by multiplying the remaining usage time by a moving speed of the electronic device.

14. The electronic device of claim 1, wherein the information of discharge temperatures includes information representing temperatures from a beginning to an end of discharge of the battery.

15. The electronic device of claim 1, wherein the unusable SOC represents an SOC at an end of a discharge voltage of the battery, which is a voltage fully discharged based on the OCV.

16. An electronic device comprising:
    a battery; and
    a processor configured to
    estimate a temperature profile including information of discharge temperatures of the battery based on a temperature of the battery, a current of the battery, and a battery model,
    determine an overvoltage profile of the battery based on the temperature profile,
    revise the overvoltage profile based on a current state of charge (SOC) and a voltage of the battery,
    estimate an unusable SOC of the battery based on the revised overvoltage profile and an open circuit voltage (OCV) profile of the battery, and control a charging of the battery based on the estimated unusable SOC.

17. A processor-implemented method of operating an electronic device, the method comprising:
estimating a temperature profile including information of discharge temperatures of a battery based on a temperature of the battery, a current of the battery, and a battery model corresponding to the battery;
determining an overvoltage profile of the battery based on the temperature profile;
revising the overvoltage profile based on a current state of charge (SOC) and a voltage of the battery;
estimating an unusable SOC of the battery based on the revised overvoltage profile and an open circuit voltage (OCV) profile of the battery; and
controlling a charging of the battery based on the estimated unusable SOC.

18. The method of claim 17, wherein the determining of the overvoltage profile comprises determining the overvoltage profile by moving the temperature profile for a starting point of the overvoltage profile to have a predetermined value.

19. The method of claim 17, wherein the revising of the overvoltage profile comprises correcting the overvoltage profile based on a current overvoltage obtained by subtracting the voltage of the battery from an OCV corresponding to the current SOC of the battery.

20. The method of claim 17, wherein the estimating of the unusable SOC of the battery comprises estimating a voltage profile by subtracting the revised overvoltage profile from the OCV profile, and estimating the unusable SOC corresponding to an end of discharging voltage (EDV) in the voltage profile.

21. The method of claim 17, wherein the battery model comprises an electrochemical model, or a simplified model of the electrochemical model, the simplified model being configured to estimate the temperature profile of the battery using parameters of the electrochemical model, or a model identical to the electrochemical model.

22. A non-transitory computer-readable storage medium storing instructions that, when executed by a processor, cause the processor to perform the method of claim 17.

* * * * *